US005767429A

United States Patent [19]

Milano et al.

[11] Patent Number: 5,767,429

[45] Date of Patent: Jun. 16, 1998

[54] AUTOMATIC STRING INSTRUMENT TUNER

[76] Inventors: Lynn M. Milano, 405 Echo Ave., Sound Beach, N.Y. 11789; Jahangir Rastegar, 35 Ivy League La., Stony Brook, N.Y. 11790; Farshad Khorrami, 96 Schermerhorn St., Brooklyn, N.Y. 11201

[21] Appl. No.: 556,108

[22] Filed: Nov. 9, 1995

[51] Int. Cl.$^{6}$ .................... G10D 3/14; G01G 7/02

[52] U.S. Cl. .................... 84/454; 84/297 R; 84/DIG. 18

[58] Field of Search .................... 84/454, 297 R, 84/298, 307, DIG. 18, 455

[56] References Cited

U.S. PATENT DOCUMENTS 3,813,983 6/1974 Paul .
4,375,180 3/1983 Scholz .................... 84/454
4,791,849 12/1988 Kelley .
4,889,029 12/1989 St. Denis .
4,899,636 2/1990 Chiba et al. .
4,909,126 3/1990 Skinn et al. .
5,038,657 8/1991 Busley .................... 84/455
5,095,797 3/1992 Zacaroli .
5,390,579 2/1995 Burgon .................... 84/454

*Primary Examiner*—William M. Shoop, Jr.
*Assistant Examiner*—Marlon T. Fletcher
*Attorney, Agent, or Firm*—Dilworth & Barrese

[57] ABSTRACT

A tuning system is described for automatically tuning a musical instrument having adjustment means for changing the frequency of a musical tone produced by a musical string of the musical instrument. The tuning system of the present invention is useful with respect to a wide variety of musical instruments, e.g., string instruments such as, guitars, harps, pianos, etc., and other instruments. A tuning system is operative to selectively tune a musical string of a stringed musical instrument to a user selected predetermined frequency value.

20 Claims, 7 Drawing Sheets

AUTOMATIC STRING INSTRUMENT TUNER

BACKGROUND

1. Field of the Invention

The present invention relates to a tuning apparatus for stringed musical instruments. More particularly, the present invention relates to a frequency responsive tuning apparatus capable of adjusting the tune of the instrument.

2. Description of the Related Art

The tuning of string musical instruments typically requires a skilled musician or technician who exercises a string or strings of an instrument, listens to the sound of the note or cord, and if necessary adjusts the tension on the string or strings to tune the instrument. This procedure is time consuming and typically cannot be done during a performance. To decrease the time needed to tune a string instrument, as well as to enable novice or unskilled musicians to properly tune a string instrument, tuning devices have been developed which adjust the tension on strings. However, it is a problem to precisely control string tension to produce the correct vibrational frequencies. With string instruments, thumb screws and tuning pegs are commonly used for adjusting string tension to tune the instrument. The initial adjustment to obtain precise string tension is a very tedious task for every performer. When new strings are installed on the instrument, a performer must first continually tension and retention each string until their resiliency stabilizes. With stable string resiliency, the performer now must continually adjust and readjust string tensions until the resiliency of the instrument's materials are stabilized in relation to the force produced by the strings when they are correctly tensioned to produce the desired frequencies.

During a performance, the strings often become out of tune due to the continuous playing of the instrument, temperature factors and the natural slippage of the string during tensioning and retensioning. As noted, attempts have been made to provide string tuning devices which minimize the difficulties associated with the manual tuning of a string instrument. For example, U.S. Pat. No. 5,038,657 to Busley relates to a string tensioning apparatus having a bidirectional motor to control the tension of each string and associated control electronics to regulate the operation of the string tensioning apparatus. Each string is directly connected to the motor shaft, whose rotation is regulated by the associated control electronics. A transducer is used to measure the frequency of operation of each string. The measured frequency is then compared to a value stored in memory to produce an indication of the difference between the actual and desired frequency of operation. This difference is then used to control the direction and amount of rotation of the motor shaft to adjust the string frequency. Manual switches are located on the instrument body to activate the motors and for tuning the instrument. However, the use of multiple motors within the instrument and the use of switches located on the body of the instrument increase the weight of the instrument, making the instrument cumbersome for a performer.

As another example, U.S. Pat. No. 4,375,180 to Scholz relates to a stringed musical instrument with an automatic self-tuning device which tightens or loosens the instrument's strings which may be out of tune. Each string is provided with an independent automatic tuning device and all of the devices are operated simultaneously on demand to automatically reset the tension of the strings. Each tuning device senses the tension of its associated string and compares the sensed tension with a reference tension corresponding to the desired tuning for the string. The string tension is then increased or decreased in response to the nature and magnitude of the comparison of string tensions.

SUMMARY OF THE INVENTION

The present invention relates to an apparatus for tuning the musical strings of a stringed musical instrument to a user selected predetermined frequency. In a preferred embodiment, the tuning apparatus of the present invention includes detection means for detecting a musical tone produced by a musical string of the stringed musical instrument. The detection means is operative to produce a signal which corresponds to the detected musical tone of the musical string when excited by the user. Preferably, the detection means includes pickup sensors located underneath the musical strings of the musical instrument. Signal conditioning means are provided and coupled to the detecting means for removing predetermined signal harmonics from the detected musical tone. Further, processing means are provided and coupled to the signal conditioning means for comparing the musical tone to a user selected frequency value. The processing means is operative to produce an electrical control signal which is a function of a difference between the detected musical tone and the user selected frequency value. Preferably, the processing means includes a central processing unit having associated random access memory (RAM) and read only memory (ROM).

The frequency responsive tuning apparatus of the present invention in accordance with a preferred embodiment includes string adjustment means coupled to the processing means and to a plurality of musical strings of the stringed musical instrument. The string adjustment means is operative to selectively adjust the tension of a chosen musical string in dependence upon the electrical control signal as produced by the processing means. The string adjusting means includes an electric motor which is responsive to the electrical control signal of the processing means. The string adjusting means further preferably includes a plurality of gear assemblies each being associated with a musical string of the stringed musical instrument. Further included is a clutch mechanism which is operatively associated with each of the plurality of gears, with the clutch mechanism being operative to selectively couple a gear assembly with the electric motor so as to selectively tune a chosen musical string with a user selected frequency value.

BRIEF DESCRIPTION OF THE DRAWINGS

Various embodiments of the apparatus of the present invention will be described hereinbelow with reference to the drawings wherein.

DETAILED DESCRIPTION

Figure 1:
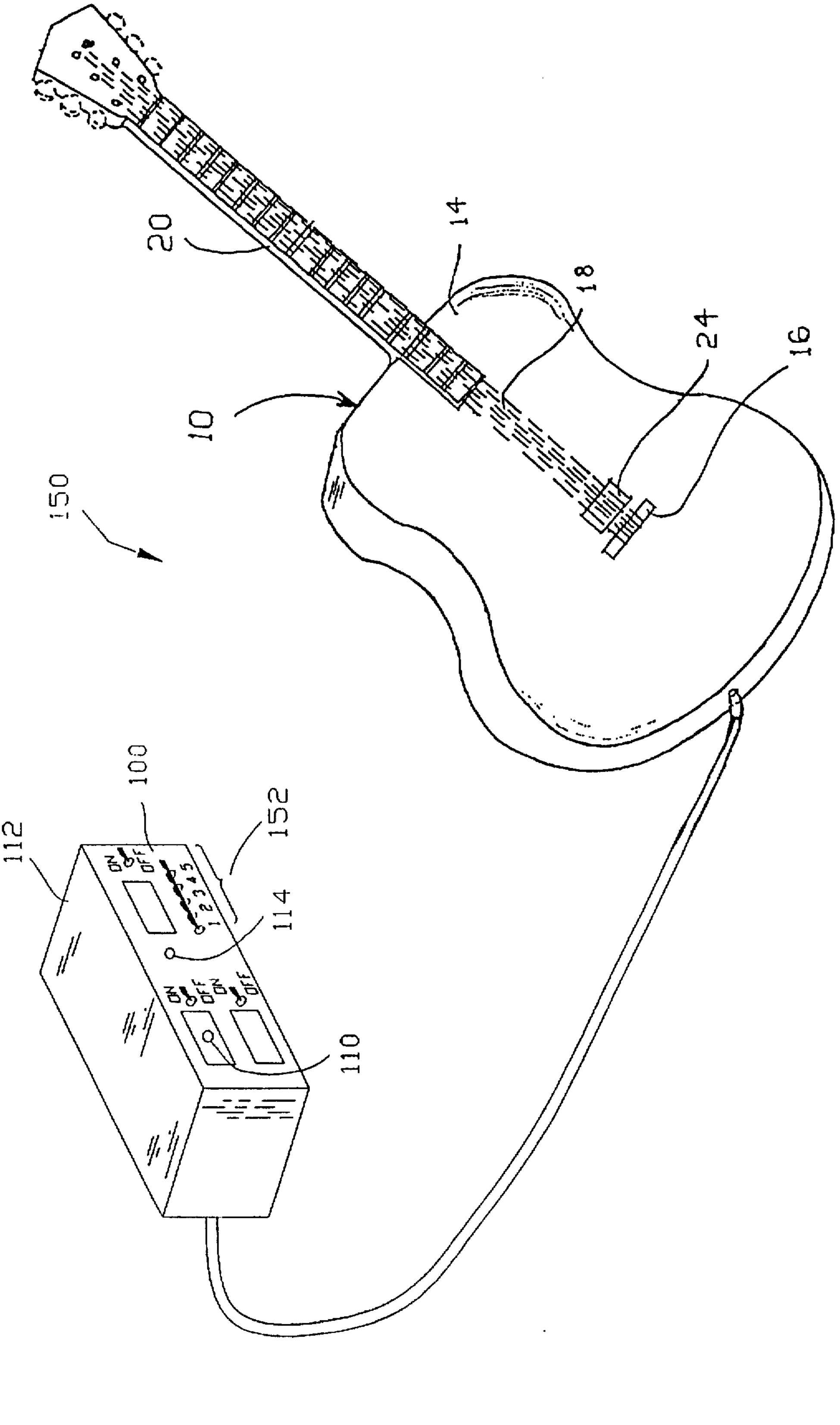
FIG. 1 is a perspective view of the signal conditioner and motor controller.

Referring now in specific detail to the drawings, in which like reference numerals identify similar or identical elements, FIG. 1 illustrates a body portion 100 of the tuner apparatus 150 electrically coupled to a guitar 10 in accordance with a preferred embodiment of the present invention. It is to be appreciated that the tuning apparatus 150 of the present invention is configured for employment in string instruments, and for illustrative and exemplary purposes, the tuner apparatus 150 will be described hereinbelow with respect to a preferred embodiment consisting of an electric guitar 10. However, the tuning apparatus may be implemented into any of the various string instruments, such as, acoustic guitars, cellos, violins and pianos. Further, it is to be understood that the electric guitar 10, as referred to hereinbelow, includes a body portion 14 having a bridge assembly 16 to support guitar strings 18, and a neck portion 20 extending from the body portion 14. As is also conventional, electric guitar 10 includes the provision of musical pickup sensors 24 positioned preferably underneath and in proximity to guitar strings 18 for detecting the harmonic frequency of each guitar string 18. Preferably, musical pickup sensors 24 may include the provision of a microphone.

Figure 2:
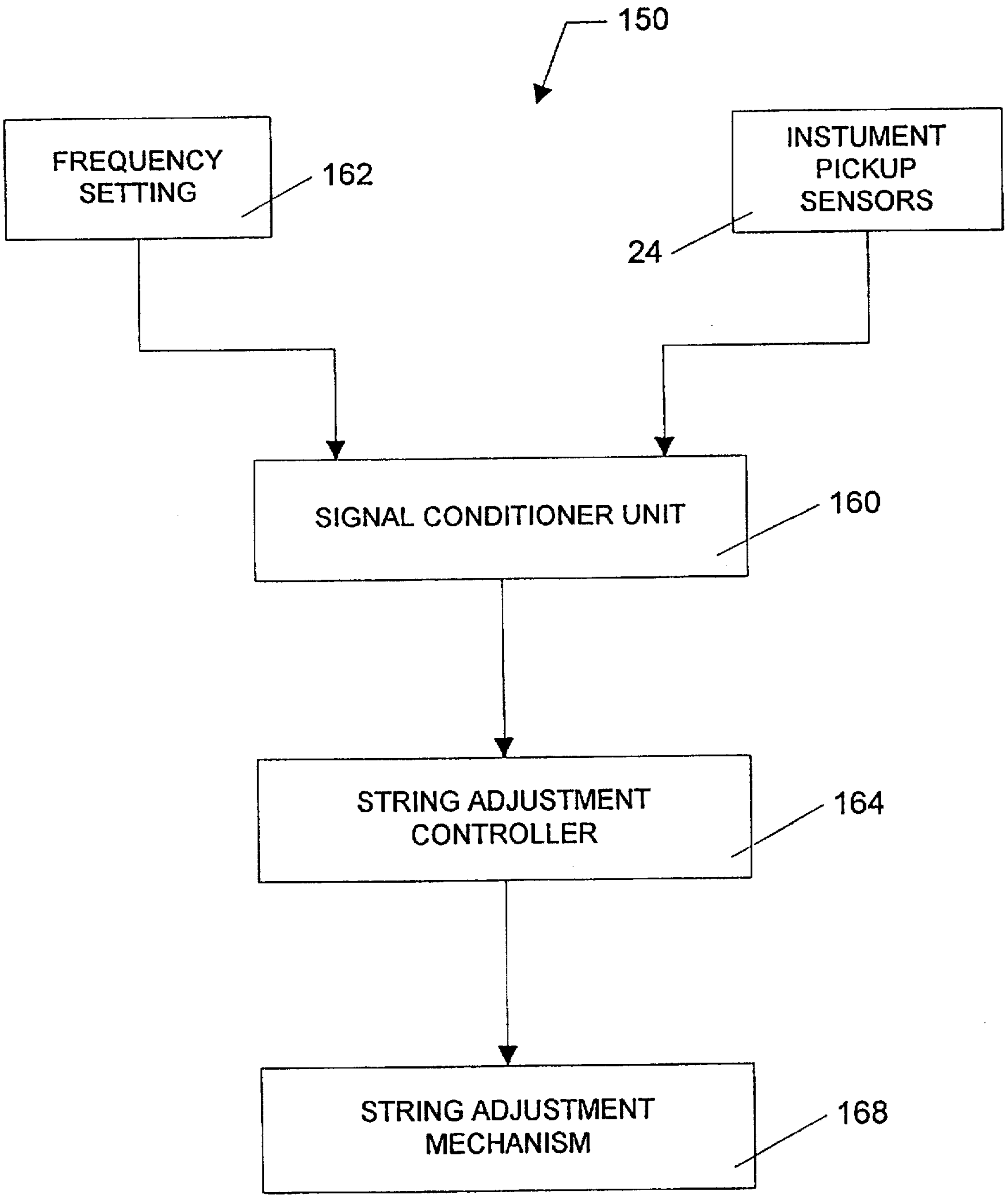
FIG. 2 is a block diagram of the tuning portion of the apparatus of the present invention shown in FIG. 1.

With reference to FIG. 2, there is illustrated a block diagram of the tuner apparatus, designated generally at 150. The tuner apparatus 150 includes a signal conditioner unit 160 which is operative to receive harmonic signals from the aforesaid instrument pickup sensors 24. Signal conditioner unit 160 is further operative to filter the input harmonic signals received from instrument pickup sensors 24 and modify the aforesaid signals so as to be in condition for a subsequent comparison to a user selected frequency, as determined by the frequency setting unit 162, so as to determine if the input harmonic signals from guitar 10, via pickup sensors 24, is properly tuned, as will be described further below. The frequency setting unit 162 is coupled to signal conditioner unit 160, wherein frequency setting unit 162 is operative to enable a user to selectively determine the aforesaid proper frequency value, via frequency setting switches 110 (FIG. 1).

The tuner apparatus 150 further includes a string adjustment controller 164 and a string adjustment mechanism 168. The string adjustment controller 164 is preferably contained in the external body portion 100 and is electrically coupled to signal conditioner unit 160 therein. String adjustment controller 164 is operatively associated with guitar strings 18 via string adjustment mechanism 168, the functionality and configuration of which will be described further below. String adjustment controller 164 receives the aforesaid modified input harmonic signals from signal conditioner unit 160 and is operative to generate electrical control signals and transfer the electrical control signals to string adjustment mechanism 168, which adjusts the proper guitar string 18 to the user selected frequency, as will be further discussed below. In particular, and as will be also further discussed below, the aforesaid electrical control signal generated from string adjustment controller 164 is a function of the difference between the current frequency value of a chosen guitar string 18, as detected by pickup sensors 24, and the desired frequency value, as selected by the user through frequency setting unit 162, via frequency setting switch 110.

In the preferred embodiment of tuner apparatus 150, the above described signal conditioner unit 160, frequency setting unit 162 and string adjustment controller 164 are contained in the body 100, located external of the guitar body 14, as shown in FIG. 1. However, it is to be appreciated that the aforesaid components of the tuner apparatus may be located internally within the guitar body 14.

Figure 3:
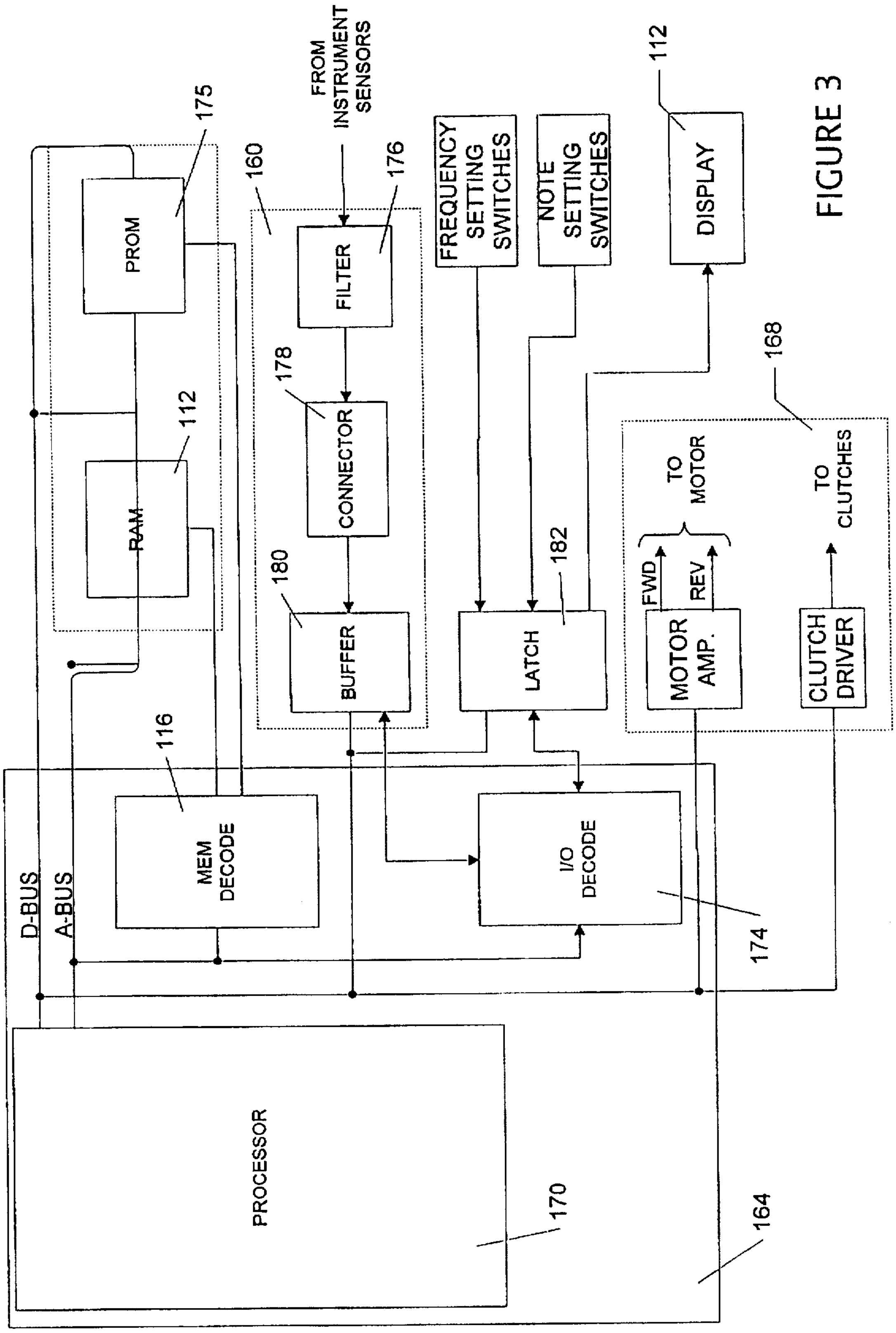
FIG. 3 is a schematic block diagram of the circuitry of the tuner apparatus of FIG. 2.

Referring now to FIG. 3, there is illustrated a block diagram of signal conditioner unit 160, string adjustment controller 164 and string adjustment mechanism 168. As shown, string adjustment controller 164 includes a processor 170, such as the Basic Stamp microprocessor, manufactured by Parallax Inc. The aforesaid processor 170 preferably includes random access memory (RAM) 172 and read only memory (ROM) 175. System and application programs are stored in the memory to control, for example, the operation of the tuning apparatus 150 of the present invention. As with such memory configurations, memory decoders 116 are utilized being configured to address particular memory from RAM 172 and ROM 175. Input/output (I/O) decoders 174 are utilized to properly regulate data flow in and out of the signal conditioner unit 160. The signal conditioner unit 160 includes a filter network 176 operative to receive signals from pickup sensors 24 (FIG. 1) and subsequently filter the later mentioned signals to isolate the desired frequency for subsequent processing. The filtered signals are then preferably converted to a digital format by an analog-to-digital (A/D) converter 178. The digital signals from A/D converter 178 are then buffered by buffer 180 and transferred to processor 170.

In the present preferred embodiment, as shown in FIG. 1 and as mentioned above, frequency setting switch 110 is provided on body portion 100 which are coupled to frequency setting unit 162. Frequency setting switch 110 is configured to be selectively actuated by the user so as to set a preselected guitar string 18 to a predetermined harmonic frequency value. Referring to FIG. 3, the data from the aforesaid frequency setting switch 110 and setting unit 162 is latched by latch 182 and transferred to processor 170 for comparison with data received from pickup sensors 24. Body portion 100 preferably includes the provision of display means 112 configured for displaying selected frequency settings, as well as the frequency of the data received from pickup sensors 24.

With continued reference to FIGS. 1–3, the usage of the present invention tuner apparatus 150 will now be discussed. It is to be appreciated that preferred embodiments of string adjustment mechanism 168 will be described further below.

First, the user determines which guitar string 18 of guitar 10 is to be properly tuned, via guitar switches 152 provided on body portion 100, as well as the selected frequency value in which the aforesaid guitar string 18 is to be tuned to through manipulation of the frequency setting switch 110 provided on tuner apparatus body portion 100. The user then, through preferably manual manipulation, excites the aforesaid selected guitar string 18, such that pickup sensor 24 preferably generates an analog (voltage) oscillating signal having a fundamental frequency value which depends upon, among other factors, the length of guitar string 18, its cross-section, material and tension. As is well known, for any given guitar string 18, by increasing its string tension, its fundamental frequency of oscillation increases. After the aforesaid oscillating signal is received from pickup sensors 24, the later signal is signal conditioned in signal conditioner unit 160 such that undesirable portions of the received signal, such as unwanted frequency spectrum, is removed therefrom enabling the capturing of a signal which is proportional to the frequency of oscillation of the guitar string 18.

Once the frequency of oscillation for the chosen guitar string 18 is obtained, string adjustment controller 164 is operative to compare the aforesaid reference desired frequency with the aforesaid measured frequency, and preferably through a control algorithm, the difference between frequencies (the desired frequency and measured frequency) is processed to compute the necessary electrical control signal which actuates the motor (as will be discussed below) which is operative to tune guitar strings 18. It is appreciated that the aforementioned process may be either performed in an analog or digital format, and continues until the error signal (i.e., the difference between the desired frequency and the measured frequency) falls within a predetermined range of the desired frequency value. In particular, the aforesaid control signal is operative such that if the measured frequency is lower than the desired frequency, it will turn the motor in the direction that will increase tension upon the selected guitar string to an amount proportional to the difference between the desired and measured frequencies. The tuner apparatus of the present invention operates in the above described manner until the preselected excited guitar string 18 is tensioned within a prescribed acceptable range of the desired frequency value. In the present preferred embodiment, a light 114 is provided on body portion 100 and is operative to illuminate when the desired tuning has been accomplished for a selected guitar string 18.

Figure 4:
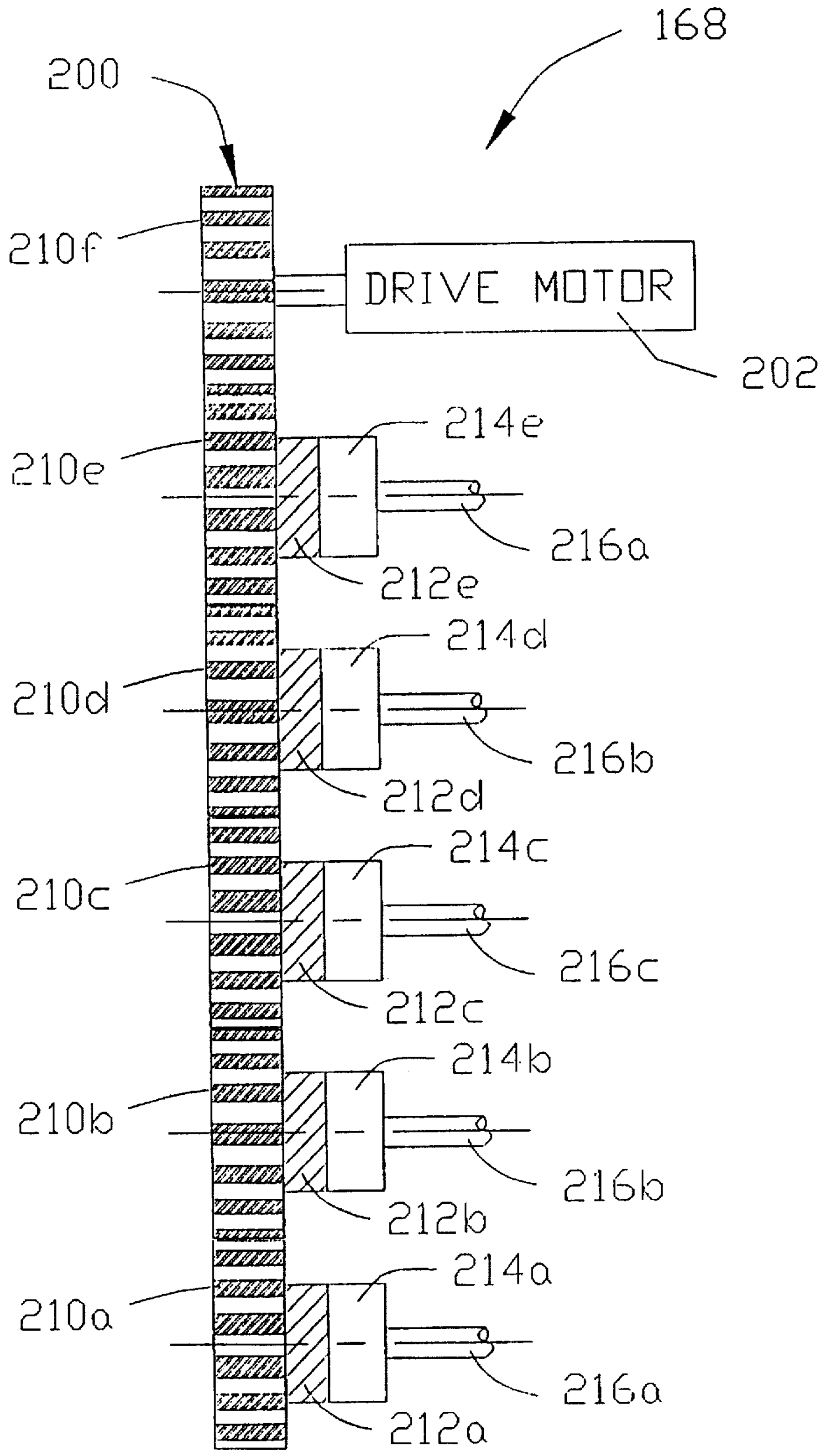
FIG. 4 is a top plan view of a stringed instrument illustrating the interior portion having a string adjustment mechanism.
Figure 5:
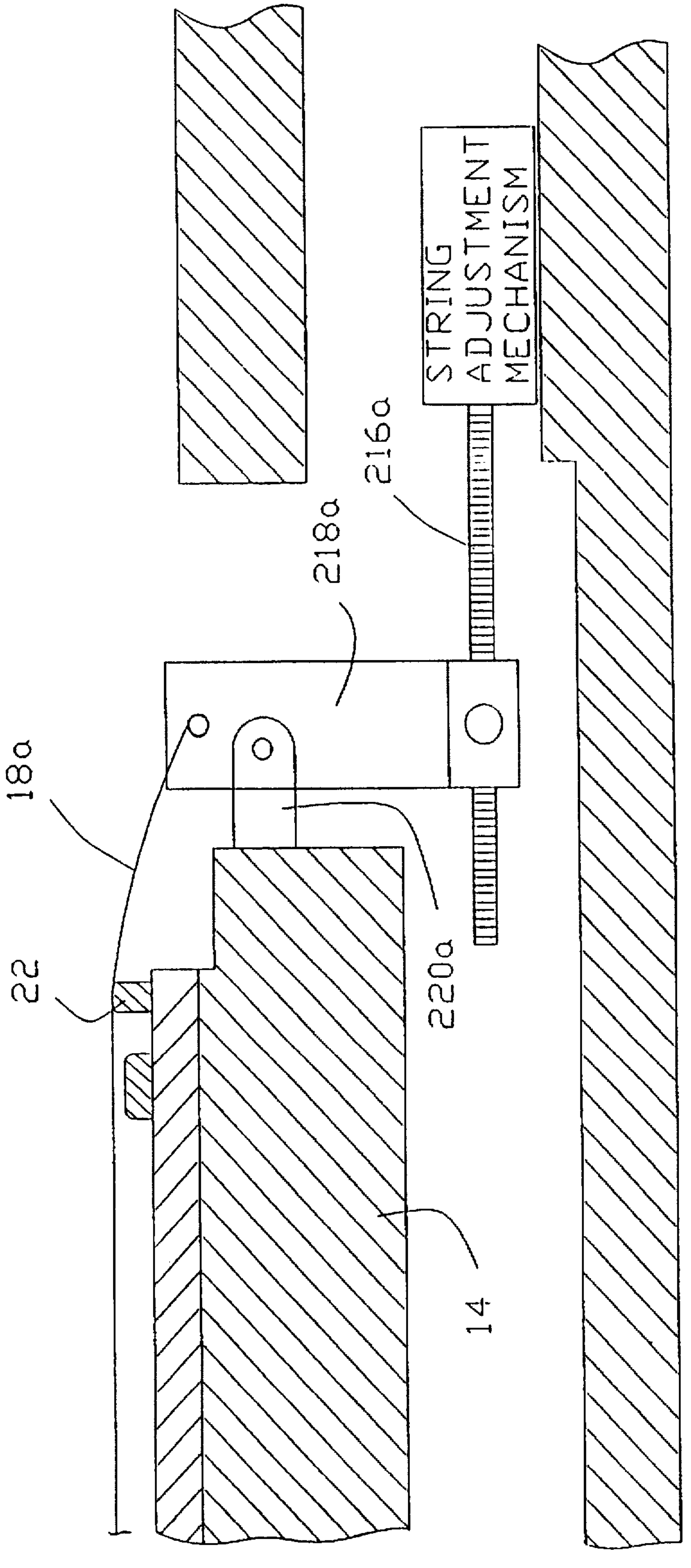
FIG. 5 is a partial cross-section of a stringed instrument illustrating a string adjustment mechanism of FIG. 4.

Referring now to FIGS. 4 and 5, a preferred embodiment of the aforesaid internal string adjustment mechanism 168 which is operative to adjust the tension of the guitar strings 18 on electric guitar 10 is shown. Internal string adjustment mechanism 168, as illustrated in the preferred embodiment of FIGS. 4 and 5, is mounted in the internal body portion of guitar 14. In the illustrated preferred embodiment, string adjustment mechanism 168 includes a gear train 200 operatively coupled to a drive motor 202. The gear train 200 is preferably a series of gears 210*a–f* wherein a single gear 210*f* at one end of the gear train 200 engages drive motor 202. Preferably, the number of gears 210*a–f* is defined by the number of guitar strings 18 provided on guitar 10. For example, in the preferred embodiment as shown in FIG. 4, their are five guitar strings 18*a–e* provided on guitar 10, and six gears 210*a–f*, one gear 210*a–e* respectively for each guitar string 18*a–e* and one gear 210*f* being dedicated for drive motor 202. Each gear 210*a–e* is operative to respectively adjust the tension on each guitar string 18*a–e* of the guitar 10. Each gear 210*a–e* associated with a respective guitar string 18*a–e* on guitar 10 is coupled to a bearing 212*a–e* secured to guitar body portion 14, and a selectively actuated clutch assembly 214*a–e*. Each clutch assembly 214*a–e* is operative to couple a respective gear 210*a–e* with drive motor 202. Each clutch assembly 214*a–e* may be mechanically actuated, for example, by moving a lever (not shown). Preferably, each clutch assembly 214*a–e* is an electrically or magnetically actuated assembly responsive to control signals provided by the aforesaid string adjustment controller 164. Further, each respective clutch assembly 214*a–e*, when activated by the string adjustment controller 164, is operative to interconnect a string adjustment drive shaft 216*a–e* with its corresponding gear 210*a–e*, the functionality of which will be discussed below.

Referring now to FIG. 5, with continued reference to FIG. 4, each string adjustment drive shaft 216*a–e* is threadingly engaged with a first end of a respective lever mechanism 218*a–e* which is pivotal connected to guitar body portion 14 about a respective hinge member 220*a–e* connected thereto. A guitar string 18*a–e* is respectively connected to a second end of a lever mechanism 218*a–e*, such that proximal movement of the second end of lever mechanism 218*a–e* towards string support 22 effects the loosening of a respective guitar string 18*a–e* while distal movement of the second end of lever mechanism 218*a–e* away from string support 22 effects the tightening of a respective guitar string 18*a–e*. Accordingly, rotational movement of a string adjustment screw 216*a–e* effects proximal movement of a second end of a respective lever mechanism 218*a–e* towards string support 22, while rotational movement of a string adjustment screw 216*a–e* effects distal movement of a second end of a respective lever mechanism 218*a–e* away from string support 22.

In use, the string adjustment controller 164 (FIG. 2) generates an electrical control signal which activates the clutch assembly 214*a–e* (FIG. 4) associated with the selected guitar string 18*a–e* to be tuned to the desired frequency, as described above. For example, if guitar string 18*c* is selected to be tuned to a desired frequency, the generated control signal from string adjustment controller 164 activates clutch assembly 214*c*. The aforesaid control signal further effects drive motor 202 to turn in a direction, which correspondingly effects string adjustment screw 216*c* to turn in either a first right handed or second left handed direction, causing guitar string 18*c* to be either loosened or tightened so as to place guitar string 18*c* to within a permissible range of the user selected desired frequency value, as detected by pickup sensors 24 and described above.

Figure 6:
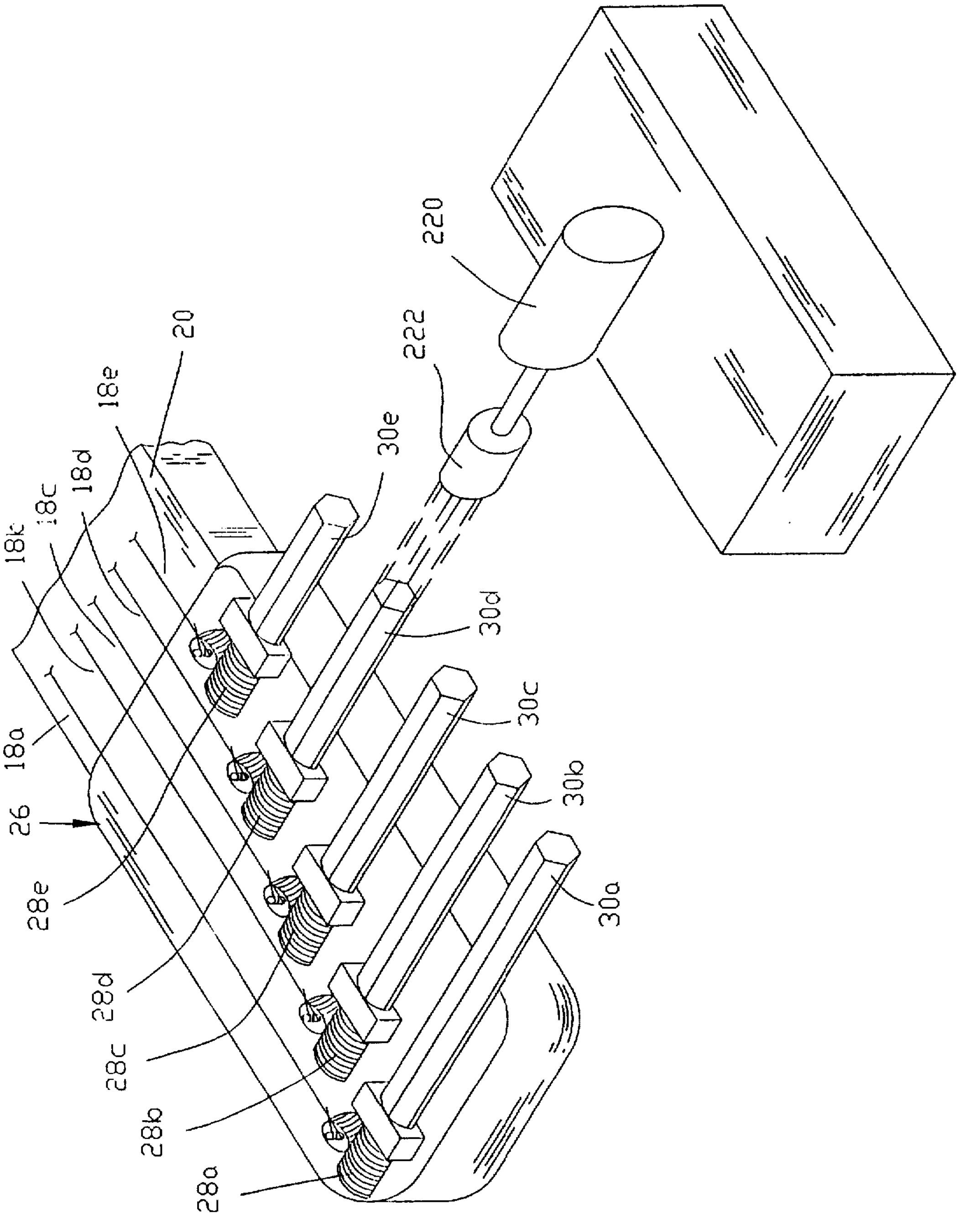
FIG. 6 is an alternative embodiment of the string adjustment mechanism adapted to drive shafts on the body of the stringed instrument.

Another preferred embodiment of the string adjustment mechanism 168 is illustrated in FIG. 6 which depicts the head region 26 of the neck portion 20 of guitar 10. In particular, the head region 26 is provided with worm gear assemblies 28*a–e* respectively. It is noted that the specific configuration of such a worm gear assembly is well known in the art and need not be described herein. Operatively connected to each aforesaid worm gear assembly 28*a–e* is an elongate drive shaft 30*a–e* respectively. Rotation of each elongate drive shaft 30*a–e* (i.e., a tuning peg of a guitar) in a first right handed direction effects a corresponding worm gear assembly 28*a–c* to loosen a corresponding guitar string 18*a–e*, while rotation of an elongate shaft 30*a–e* in a second left handed direction effects a corresponding worm gear assembly 28*a–e* to tighten a corresponding guitar string 18*a–e*. In the illustrated preferred embodiment of FIG. 6, each elongate shaft 30*a–e* are formed to have a hexagonal configuration for enabling detachable engagement with a drive motor, as will be further discussed below. However, it is to be appreciated that the hexagonal configuration is only one of many configurations which may be employed for enabling the aforesaid detachable engagement. For example, coupling devices such as splines, square shaped shafts and various screw head types may be employed to enable the later mentioned detachable engagement between a drive motor 220 and an elongate shaft 30*a–e*.

A drive motor 220 is electrically coupled to body portion 100 of the tuner apparatus 150 of the present invention (FIG. 1), whereby drive motor 220 is provided with a head portion 222 configured for the aforesaid detachable engagement with the end portion of an elongate drive shaft 30*a–e*. Preferably, in the preferred embodiment of FIG. 6, head portion 222 is of a hexagonal configuration, but is not to be limited thereto, as mentioned above.

In use, the user manually engages the head portion 222 of drive motor 222 with an elongate drive shaft 30*a–e* being respectively associated with a guitar string 18*a–c* the user desires to tune to a selected frequency value. After the user has selected the desired frequency and excited the guitar string 18*a–e* which is to be tuned, as mentioned above, the string adjustment controller 164 generates an electrical control signal which effects drive motor 220 to rotate in a direction which correspondingly effects an engaged elongate drive shaft 30*a–e* to turn in either an aforesaid first right handed or second left handed direction, causing the engaged worm gear assembly 28*a–e* to either loosen or tighten the selected guitar string 18*a–e* so as to be tensioned to vibrate within a permissible range of the user selected frequency value. The user may repeat the aforementioned process with respect to another guitar string 18*a–e* so as to properly tune that selected guitar string 18*a–e* to a selected frequency value.

Figure 7:
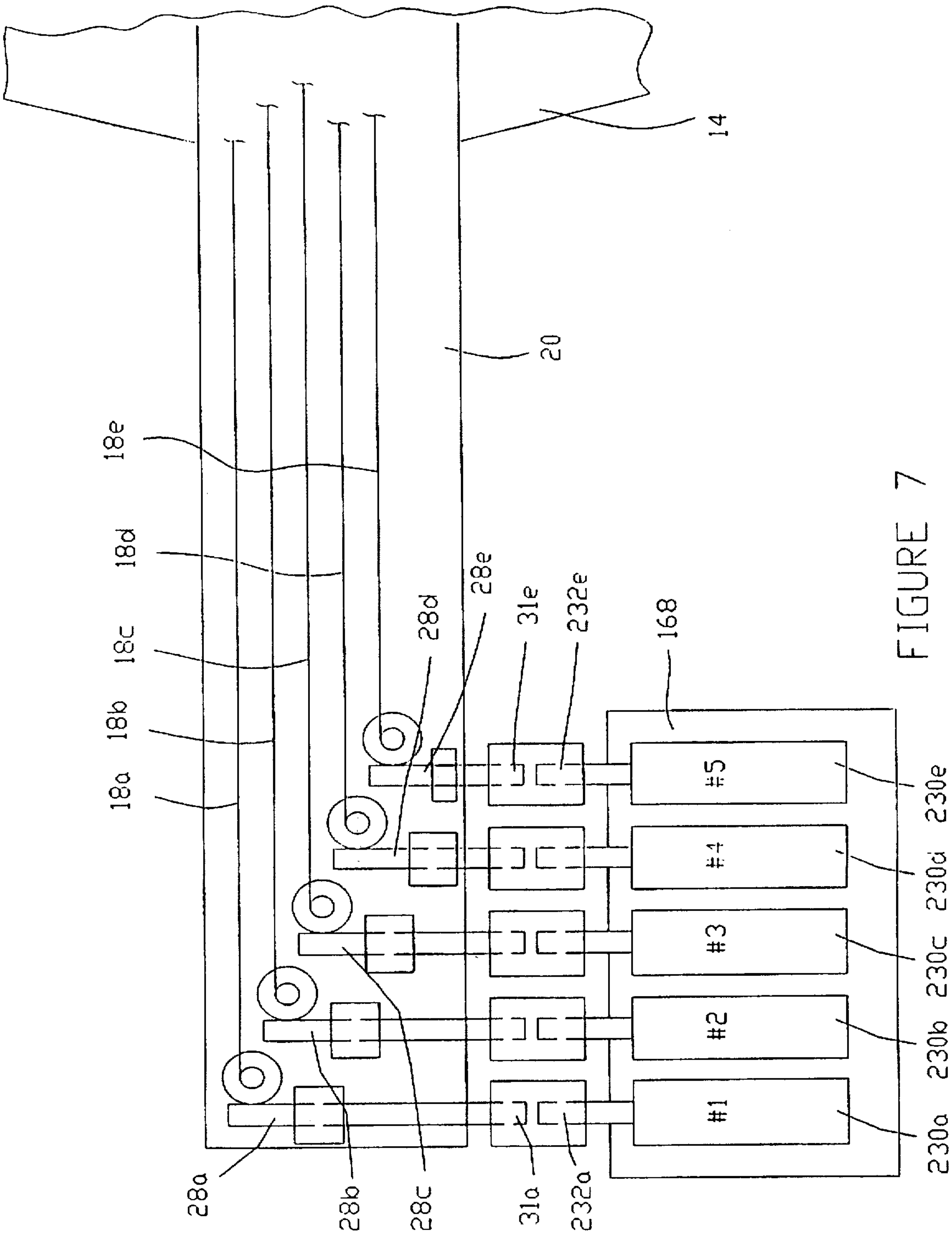
FIG. 7 is a top plan view of a portion of a stringed instrument illustrating multiple drive motors for tensioning the strings of the instrument.

Yet another embodiment of the string adjustment mechanism 168 is illustrated in FIG. 7. This embodiment is substantially similar to the embodiment of the string mechanism illustrated in FIG. 6 with the exception that the body portion 100 of the tuner apparatus, and more particularly, the string adjustment controller 164, is electrically coupled to drive motors 230*a–e*. Drive motors 230*a–e* are provided with a respective head portion 232*a–e* being configured to detachable engage with the end portion 31*a–c* of each respective elongate shaft 30*a–e*, as shown in FIG. 7. Further, and as mentioned above, the body portion 100 of the tuner apparatus 150 is provided with drive motor switches 152 operative to activate a respective drive motor 230*a–e* when activated.

In use, the user first activates the drive motor switch 152 which corresponds to the guitar string a–e the user desires to tune. The user then selects a desired frequency for the selected guitar string 18*a–e* and after which the user excites the selected guitar string a–e. As described above, the string adjustment controller 164 generates an electrical control signal operative to rotate the drive motor 230*a–e* corresponding with the selected guitar string 18*a–e* in a direction so as to properly tune the selected guitar string 18 to be within the desired frequency range.

Alternatively, the body portion 100 of the tuner apparatus 150 will contain electronics and hardware sufficient to tune each string 18*a–e* simultaneously. For example, the tuner apparatus 150 of FIG. 2 may have five separate signal conditioning units 160, string adjustment controllers 164 and string adjustment mechanism 168, each configured as a separate tuner apparatus 150. Each separate tuner apparatus 150 would have a single instrument pickup sensor 24 for a particular string 18*a–e*, and the user selected frequency for each string would be determined by one of five frequency settings 162 dedicated to the particular string 18*a–e*. Thus, all five strings 18*a–e* could be tuned by the five separate tuner apparatus 150 simultaneously.

Alternatively, a single string adjustment controller 164 would interface with five separate signal conditioner units 160 and five separate string adjustment mechanisms 168. Each signal conditioner unit 160 would receive an input from one of the five instrument pickup sensors 24, and process it for the string adjustment controller 164. Thus, the modified input harmonic signal from each signal conditioner unit 160 would correspond to a particular guitar string 18*a–e*. The frequency setting 162 pertinent to the particular signal conditioning unit 160 for a particular string 18*a–e* would be fixed, and the frequency setting switching 110 (of FIG. 1) could be eliminated. The output of the string adjustment controller 164 for the particular signal conditioner unit 160 would be sent to the string adjustment mechanism 168 corresponding to the same string. Presuming that the processor 170 (see FIG. 3) has sufficient capacity to handle the processing of all five strings 18*a–e* simultaneously (or in a multiplexing process), all five strings 18*a–e* could be adjusted simultaneously.

While the invention has been particularly shown and described with reference to certain preferred embodiments, it will be understood by those skilled in the art that various modifications in form and detail may be made therein without departing from the scope and spirit of the invention. Accordingly, modification to the preferred embodiments will be readily apparent to those skilled in the art, and the generic principles defined herein may be applied to other embodiments without departing from the spirit and scope of the invention. Thus, the present invention is not intended to be limited to the embodiments shown, but it is to be accorded the widest scope consistent with the principles and features disclosed herein.

What is claimed is:

1. An apparatus for tuning a stringed musical instrument, said apparatus comprising:

detection means for detecting a musical tone produced by said instrument and producing a signal corresponding to said tone;

processing means coupled to said detection means for comparing said signal to a reference value associated with a desired frequency and producing an electrical control signal, said electrical control signal being a function of the difference between said signal and said reference frequency value; and string adjustment means coupled to said processing means and to a plurality of strings associated with said stringed musical instrument for selectively adjusting the tension of said plurality of strings in dependence upon said electrical control signal, said string adjustment means including:

at least one electric motor responsive to said electrical control signal;

transmission means coupled to the at least one electric motor and associated with said plurality of strings for adjusting the tension of each said string, said transmission means being selectively actuable such that at least one string may be selectively adjusted in accordance therewith.

2. An apparatus for tuning a stringed musical instrument as recited in claim 1, wherein said transmission means further includes a clutch mechanism for selectively adjusting the tension of each said string.

3. An apparatus for tuning a stringed musical instrument as recited in claim 1, wherein said detection means includes musical pickup sensors positioned in proximity to said plurality of strings on said stringed musical instrument.

4. An apparatus for tuning a stringed musical instrument as recited in claim 3, wherein said musical pickup sensors include at least one microphone.

5. An apparatus for tuning a stringed musical instrument as recited in claim 1, further including signal conditioning means coupled to said detection means for removing predetermined signal harmonics from said signal.

6. An apparatus for tuning a stringed musical instrument as recited in claim 5, wherein said signal conditioning means includes an analog to digital converter for converting said signal from an analog signal to a digital signal.

7. An apparatus for tuning a stringed musical instrument as recited in claim 1, wherein said processing means includes a central processing unit having associated random access memory and read only memory.

8. An apparatus for tuning a stringed musical instrument as recited in claim 2, wherein said transmission means further includes a plurality of lever mechanisms operatively connected to each said string, respectively, such that respective pivotal movement of said lever mechanisms is determinative to the respective tensioning of said strings operatively connected to said pivoting lever mechanisms.

9. An apparatus for tuning a stringed musical instrument, said apparatus comprising:

detection means for detecting a musical tone produced by said instrument and producing a signal corresponding to said tone;

processing means coupled to said detection means for comparing said signal to a reference value and producing an electrical control signal, said electrical control signal being a function of the difference between said signal and said reference value; and string adjustment means coupled to said processing means and a plurality of strings associated with said stringed musical instrument for selectively adjusting the tension of said plurality of strings in dependence upon said electrical control signal, said string adjustment means including:

i) at least one electric motor responsive to said electrical control signal;

ii) a plurality of gears, said each gear being operatively associated with a said each string respectively; and iii) a clutch mechanism operatively associated with said plurality of gears for selectively coupling at least one of said plurality of gears with said at least one electric motor.

10. An apparatus for tuning a stringed musical instrument as recited in claim 9, further including signal conditioning means coupled to said detection means for removing prescribed signal harmonics from said signal, said signal conditioning means including a filter network.

11. An apparatus for tuning a stringed musical instrument as recited in claim 9, wherein said string adjustment means further includes a plurality of drive shafts, each said drive shaft being operatively connected to a said gear respectively.

12. An apparatus for tuning a stringed musical instrument as recited in claim 11, wherein said string adjustment means further includes a plurality of lever mechanisms, each said lever mechanism being operatively connected to a said string respectively and each said lever mechanism being rotatably connected to a said drive shaft respectively such that the rotational direction of a said drive shaft is determinative of the tensioning of a said string.

13. An apparatus for tuning a stringed musical instrument as recited in claim 9, wherein said detection means includes musical pickup sensors positioned in proximity to said plurality of strings.

14. An apparatus for tuning a stringed musical instrument as recited in claim 9, further including frequency setting means coupled to said processing means and operative to enable a user to selectively choose said predetermined frequency value.

15. An apparatus positioned external of a musical instrument for tuning said stringed musical instrument, said apparatus comprising:

detection means for detecting a musical tone produced by said instrument and producing a signal corresponding to said tone;

processing means coupled to said detection means for comparing said signal to a reference value associated with a desired frequency and producing an electrical control signal, said electrical control signal being a function of the difference between said signal and said reference value; and string adjustment means coupled to said processing means and a plurality of strings associated with said stringed musical instrument for selectively adjusting the tension of each said string in dependence upon said electrical control signal, said string adjustment means including:

i) at least one electric motor responsive to said electrical signal said at least one electric motor being fixably mounted external of said string musical instrument; and ii) coupling means for detachably coupling at least one electric motor to a said string of said musical instrument.

16. An apparatus positioned external of a musical instrument for tuning said stringed musical instrument as recited in claim 15, further including a plurality of electric motors positioned external of said musical instrument, wherein said coupling means is adapted to detachably couple said plurality of electric motors to said plurality of strings.

17. An apparatus positioned external of a musical instrument for tuning said stringed musical instrument as recited in claim 16, wherein said plurality of electric motors is fixably attached to said plurality of strings.

18. An apparatus for tuning a stringed musical instrument as recited in claim 15, wherein said detection means includes musical pickup sensors positioned in proximity to said plurality of strings of said stringed musical instrument.

19. An apparatus positioned external of a musical instrument for tuning said musical instrument as recited in claim 18, wherein musical pickup sensors include at least one microphone.

20. An apparatus for tuning a stringed musical instrument as recited in claim 15, wherein said processing means includes a central processing unit having associated random access memory and read only memory.

* * * * *